United States Patent [19]
Held

[11] Patent Number: 4,921,569
[45] Date of Patent: May 1, 1990

[54] DOUBLE BAND PRESS INCLUDING ELECTRIC CURRENT MEANS

[76] Inventor: Kurt Held, Alte Str. 1, D-7218 Trossingen 2, Fed. Rep. of Germany

[21] Appl. No.: 193,410

[22] Filed: May 12, 1988

[30] Foreign Application Priority Data

May 22, 1987 [DE] Fed. Rep. of Germany ....... 3717308

[51] Int. Cl.$^5$ .................. B30B 5/06; B30B 15/34
[52] U.S. Cl. ..................... 156/380.6; 100/93 RP; 100/151; 156/583.5; 219/243; 219/388
[58] Field of Search ............ 156/379.6, 379.8, 379.9, 156/380.6, 583.4, 583.5; 100/38, 92, 93 RP, 151, 153, 154; 425/371, 407; 219/243, 244, 388

[56] References Cited

U.S. PATENT DOCUMENTS

| | | | |
|---|---|---|---|
| 2,556,008 | 6/1951 | Spalding | 219/244 |
| 3,795,470 | 3/1974 | DeMets | 425/371 |
| 4,202,721 | 5/1980 | Roberts | 100/93 RP |
| 4,541,889 | 9/1985 | Held | 156/583.5 |

FOREIGN PATENT DOCUMENTS

| | | |
|---|---|---|
| 2421296 | 11/1975 | Fed. Rep. of Germany . |
| 3325578 | 1/1985 | Fed. Rep. of Germany . |
| 0026778 | 12/1963 | Japan ........................ 156/380.6 |

Primary Examiner—Michael W. Ball
Assistant Examiner—Steven D. Maki
Attorney, Agent, or Firm—Toren, McGeady & Associates

[57] ABSTRACT

A double band press for the continuous production of endless material webs has redirecting drums rotatably supported in bearing brackets on a rigid press stand. An upper and a lower heatable endless press band is respectively directed over two reversing drums. The material web is guided between two external surfaces of the press bands which are opposite each other in a reaction zone, and is pressed or extruded by application of area pressure. Heat is transferred to the material web in the reaction zone by the press bands during application of area pressure. A direct or alternating current is sent through the press bands for heating therein. The current flowing in the press band producing heat because of the electrical resistance of the press band material.

16 Claims, 3 Drawing Sheets

DOUBLE BAND PRESS INCLUDING ELECTRIC CURRENT MEANS

FIELD AND BACKGROUND OF THE INVENTION

The present invention is directed in general to double band presses for the continuous production of endless material webs and, in particular, to a new and useful double band press which uses the passage of current through the band to heat the material web.

Double band presses of this type (DE-OS 24 21 296) serve particularly for the fabrication of decorative plastic laminates, chipboard, fiberboard, plywood panels, copper-coated electrolaminates which are the initial material for printed circuit boards, thermoplastic webs and other laminated materials.

To obtain a good quality final product, it is necessary to cure the binder (synthetic resin) contained in the material to be molded under pressure during the passage of the material through the double band press and, simultaneously, to transfer the quantity of heat required for curing to the material to be molded. Since the heated press bands have only a certain heat capacity, the maximum amount of heat which can be transmitted to the molding material is limited and insufficient for many applications. The supply of additional heat through heating or pressure plates and through fluid pressure means is limited by the bad heat conductivity of fluid media.

It is indeed known to preheat the molding material already before entry into the double band press, for instance, by infrared radiation. However, this can result in an undesirable precondensation of the resin contained in the molding material so that an end product of a lower quality is formed. Furthermore, the energy costs are uneconomically high in this type of heat transmittal and no predetermined temperature gradient can be produced by this measure in the molding material during the pressing or extrusion process, as this is advantageous in some applications.

It is known from DE-OS 33 25 578 to supply heat in the reaction zone of a double band press by arranging elements of a material with good heat conductivity in the pressure equalizing plate of the double band press. These elements are connected to the heating or pressure plate so as to have a good heat transmission contact and contact the inner side of the press band in a dragging or sliding manner. It is however disadvantageous here that these elements must be pressed with a specific force against the inner surface of the band in order to achieve a good heat transmission contact, whereby the tensile forces applied to the press band increase. In order to be able to transmit the heat quantities required in actual practice, provision of a large quantity of such heat conducting elements is necessary so that, thereby, the maximum allowable band stresses in the press band can be exceeded. In addition, there exists the danger of destruction of the surface of the press band by the frictional forces arising between the band's inner surfaces and the heat conducting elements pressed against them, which frictional forces arise in the course of the dragging or sliding motion of the press bands along the heat conducting elements.

SUMMARY OF THE INVENTION

It is the task of the present invention to improve heat transmission to the material to be extruded or pressed in the region of the pressure equalizing plate in a double band press of this species in such a way that practically no additional frictional forces are applied to the press band surfaces and so that the maximum allowable tension stresses in the press band are not exceeded during operation of the double band press.

To this end, the invention involves the application of AC or DC current through the bands of the press, at least in the reaction region, to heat the bands by electrical resistance heating, and thus heat the material being pressed.

The advantages achievable by the invention consist particularly in that the heat in the reaction zone of the double band press is transmitted practically in a contactless manner. Thus, no additional tensile forces for moving the press bands are required. Furthermore, destructive frictional forces do not arise, so that the useful life of the expensive press bands is lengthened and the energy required for operating the double band press is reduced. In a double band press according to the invention, a predetermined temperature profile or temperature gradient can be adjusted advantageously in the reaction zone that is bounded by the pressure equalization plate.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DESCRIPTION OF THE PREFERRED EMBODIMENTS

Figure 1:
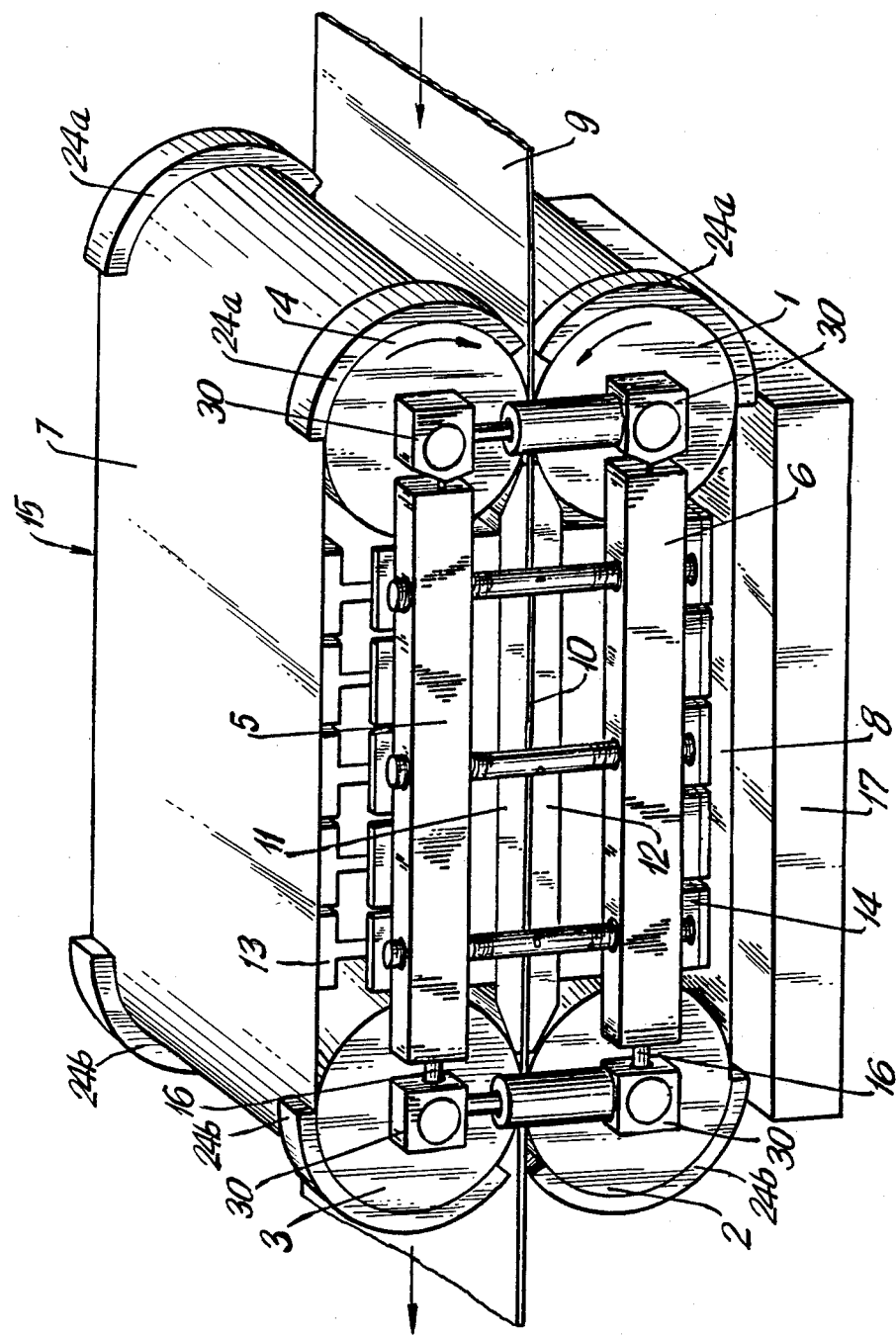
FIG. 1 is a schematic front perspective view of a double band press of the invention.

Referring to the drawings in particular, the invention embodied in FIG. 1 comprises a double band press 15 including a rigid press stand supporting upper and lower press bands 7, 8 which can be heated directly by the passage of current therethrough for providing heat to a material web being formed between the bands.

The double band press 15 for the continuous production of material webs 9 depicted diagrammatically in FIG. 1, has four reversing drums 1, 2, 3, 4 rotatably supported in bearing brackets 5, 6. Each press band 7, 8 is slung respectively around a pair of reversing drums 1, 2 and 3, 4. Each band 7, 8 usually consists of high tensile steel band. The press bands 7, 8 are stretched by known means, for instance, hydraulic cylinder 16. The reversing drums 2, 3 are driven in a manner known as such and is therefore not depicted here, and herein draw the press bands 7 and 8 through the double band press 15 so that their outer surfaces lie opposite each other in the central region of the double band press 15, and so that the press bands move horizontally with equal speed parallel to each other and form a reaction zone 10 therebetween. The direction of revolution is indicated by arrows in the reversing drums 1 and 4. Between these press bands 7, 8, the material web 9 is fed in FIG. 1 from the right to the left. Web 9 can consist of laminated materials impregnated with synthetic resin, fiber-binder mixtures or the like. It is compacted with simultaneous application of heat and pressure. Should the molding material require such a treatment, it can subsequently be cooled while it is still maintained under pressure.

The pressure exerted upon the material web 9 is applied hydraulically by pressure plates 11, 12 to the inner surfaces of the press bands 7, 8 and is from there transmitted to the material web 9. The reaction forces exerted by the molding material are transmitted to the press stand, which is only indicated schematically here, through the pressure plates 11, 12 and support columns 13, 14 connected to them. The press stand is connected to a base plate 17 by means of vertical pillars located at the rear side of the double band press 15 as viewed in FIG. 1.

The reversing drums 1, 4 at the inlet are heated, for instance, by thermal oil, which is circulated in channels 18 (FIG. 2) in circumferential jackets 19 of the reversing drums 1, 4. In this way, the press bands 7 and 8 are heated. The quantity of heat absorbed by these pres bands is transmitted because of their thermal capacity, into the reaction zone 10 and is transferred from there to the material web 9, where it serves for the curing process of the molding material.

Figures 2, 3:
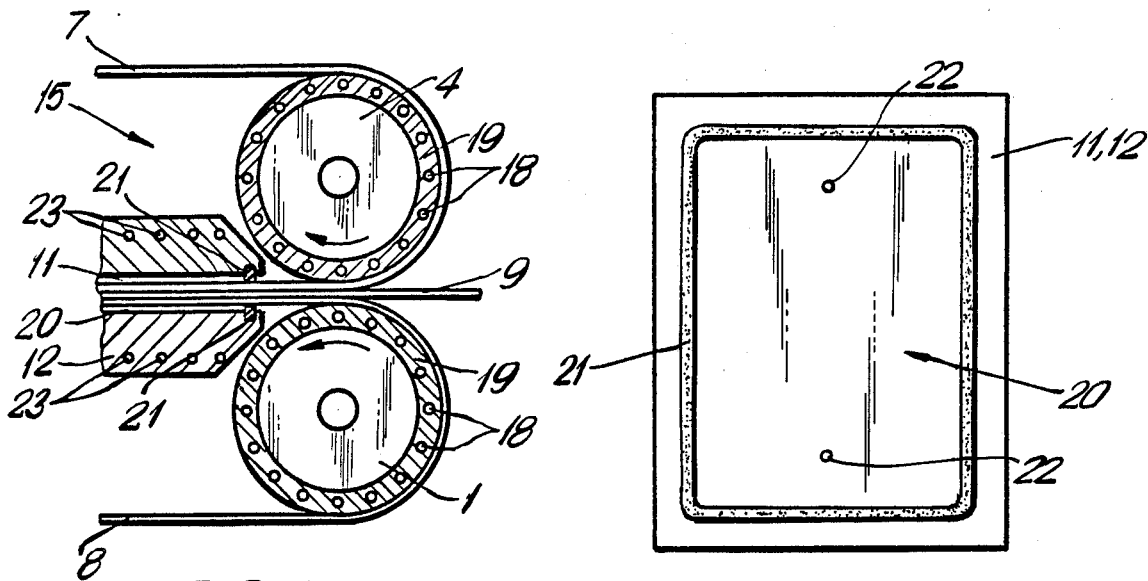
FIG. 2 is a partial longitudinal sectional view taken through the inlet region of the double band press of FIG. 1.
FIG. 3 is a plan view of a pressure plate viewed from the rear surface of the press band.

A fluid pressure medium which can be put under pressure is directed into the space between the pressure plate 11, 12 and the inner surface of the pressure band section 7, 8 for generation of area pressure acting upon the material web 9. In this space, a so-called pressure chamber 20 is bounded on its side by seals 21 which are closed on themselves in an annular fashion as shown in FIG. 3. These seals 21 are supported in the pressure plate 11, 12 and contact with surface and contact pressure against the inner surfaces of the press band 7, 8 in a dragging or sliding manner. Thus, the seals 21 act as floating or sliding face seals. FIG. 3 shows pressure chamber 20 viewed from the press band rear surface in plan view. Each pressure plate 11, 12 consists of a steel plate and has a rectangular shape. A groove is configured in the edge region thereof continuously around its periphery, in which the seal 21 forming a boundary toward all sides is located. Depending on their size, one or several inlets 22 are provided in the pressure plate 11, 12, through which the pressure medium is introduced into the pressure chamber 20. Synthetic oil is used as the pressure medium and stands up well under operational conditions existing in the double band press. A gas, for instance, compressed air, can be used equally well. The pressure plate 11, 12 can be provided with transverse or longitudinal bores 23 (see FIG. 2) for heating the pressure plate 11, 12 through which bores circulates heatable thermal oil.

In some cases for particular materials to be molded, the heat quantity absorbed by the press band 7, 8 at the reversing drums 1, 4 and transmitted to the material web 9 in the reaction zone 10 is insufficient for complete curing of the molded material. Since the mentioned fluid pressure means is a bad conductor of heat, it is difficult to transmit heat in sufficient quantity from the pressure plate 11, 12 to the press bands 7, 8. In order to eliminate this difficulty, the press bands 7, 8 in the double band press 15 are additionally heated by resistance heating or inductive heating by means of eddy current losses. It has been the experience that hereby a considerably better heat transmission from the press bands 7, 8 to the material web 9 passing through the reaction zone 10 can be achieved.

Figure 5:
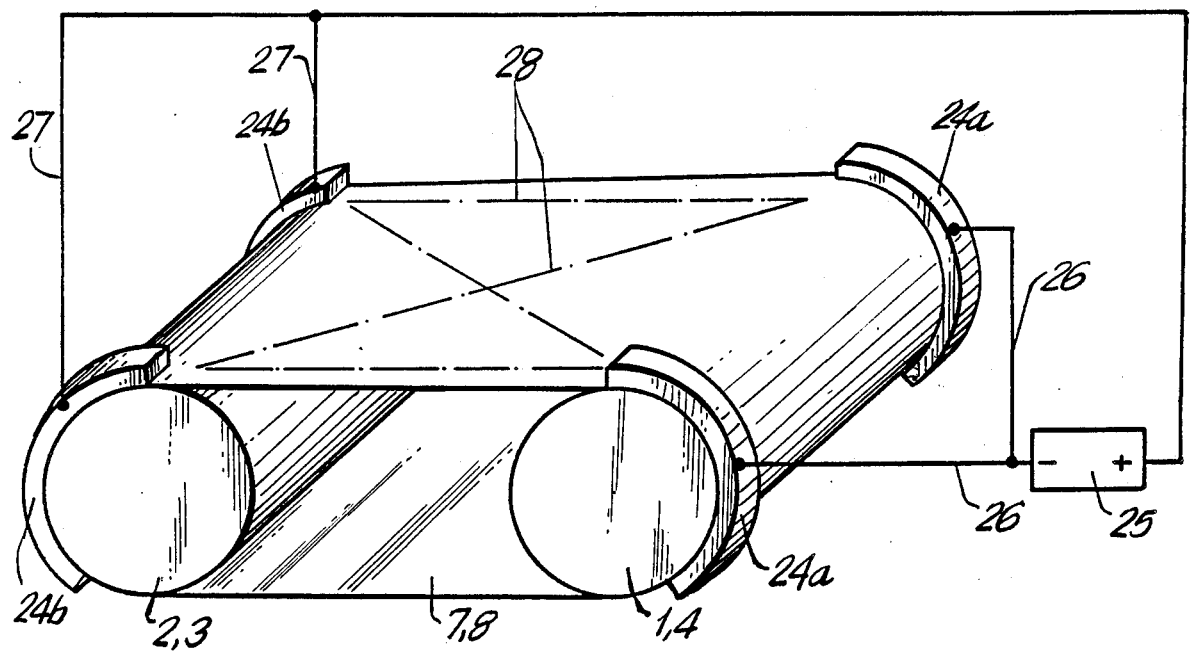
FIG. 5 is a schematic electrical block diagram for the resistance heating of a press band.

As can be discerned from FIG. 1, slip ring transmitters 24a and 24b are attached to the left and righthand sides of the press 15, at the reversing drums 1, 2, 3, 4, for heating the press bands 7, 8 by means of electrical resistance heating. To this end, slip rings which pass an electrical DC voltage are applied to the press bands 7, 8. The principle of the electrical circuit is shown in more detail in FIG. 5. The negative pole of a source of DC voltage 25 is connected by lines 26 to the slip ring transmitters 24a, shown on the right in the drawing, which slip rings are located at the reversing drums 1 or 4. The positive poles of the source of DC voltage 25 is connected by the lines 27 to the slip ring transmitters 24b shown on the left in the drawing which are located at the reversing drums 2 or 3. Because of this, current flows through the press bands 7, 8 from the slip ring transmitters 24b to the slip ring transmitters 24a. The basic current flows are indicated in FIG. 5 with the reference numeral 28. Because of the specific resistance of the press bands 7, 8, there arises a voltage drop along the press bands which leads to heating of the press bands 7, 8. Since the special steels generally used for the press bands are materials with a relatively high specific resistance, a considerable quantity of heat is generated. This quantity of heat, and with it the temperature increase of the press band, can be regulated in a desired manner by selection of the applied voltage and current flow of the source of DC voltage 25.

Figure 4:
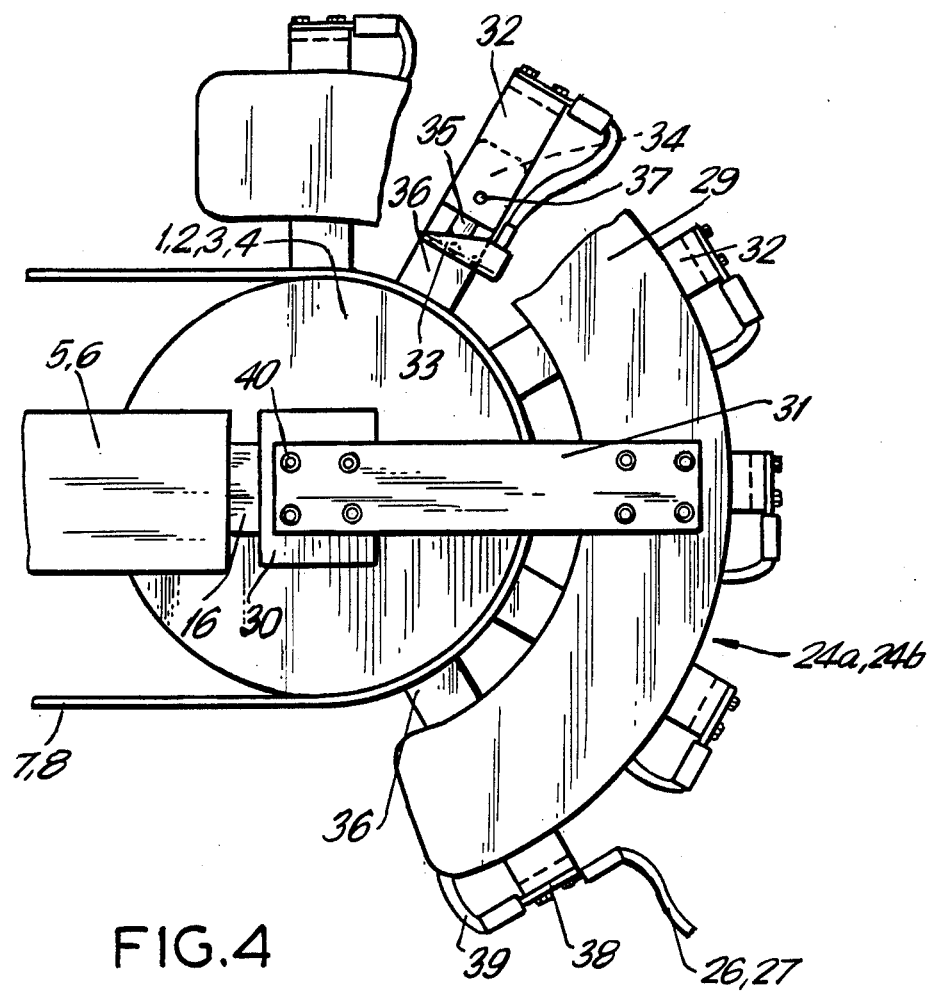
FIG. 4 is a partial elevational view of a slip ring transmitter for transmitting the current to the press band.

The detailed design of the slip ring transmitter 24a, 24b is shown in FIG. 4. The slip ring transmitter 24a, 24b consists of an arc-shaped frame plate 29 whose radius is somewhat larger than that of the reversing drums 1, 2, 3, 4. The frame plate 29, which is not entirely semicircular constitutes a circular segment of 150° and is attached in a stationary manner to a support 31 in such a way at mountings 30 for the reversing drums 1, 2, 3, 4, that it does not touch the press band 7, 8. Elongated brush mountings 32 spaced appropriately from each other are attached to the frame plate 29. For simplicity only, the frame plate 29 of the slip ring transmitters 24a, 24b are depicted in FIG. 5. Inserts 34 are located in the brush mountings 32, which each serve for receiving a brush holder 33. The brush holder 33 is displaceable radially of the drum 1, 2, 3, or 4, with respect to the insert 34 by a linkage 35. The brush 36 proper which contacts the press band 7, 8 in a sliding manner, is fastened in the brush holder 33. The brush mounting 32 is rotatable around a pivot point 37 at the frame plate 29 and is adjusted together with the displaceable brush holder 33 in such a way that the brush 36 contacts the press band 7, 8 in an optimum manner.

A copper plate 38 is attached at the end of the brush mounting 32 facing away from the press band 7, 8, the lines 26, 27 leading from the DC voltage source 25 to the copper plate 36. Additional copper lines 39 lead from the copper plate 38 to the brush holder or socket 33. With this, the brush 36 is is in contact with the appropriate pole of the DC voltage source 25 and thus transmits the voltage and current to the press band 7, 8. The number of brushes depends on the magnitude of the current to be transmitted. Graphite, bronze, copper or the like is a suitable material for the brush. Naturally, the brushes 36 can be fastened not only near the edges of the press band 7, 8, but they can also be distributed across the entire width of the press band at appropriate spacings.

In order to prevent an unintentional transmission of electrical current to the machine stand, an insulating plate (not shown in the drawing) is positioned between the support 31 and the mounting 30. Equally, insulating washers are located beneath the attachment screws 40 for the support 31. The reversing drums 1, 2, 3, 4 can be rubber coated to provide insulation against the press bands 7, 8.

Figure 6:
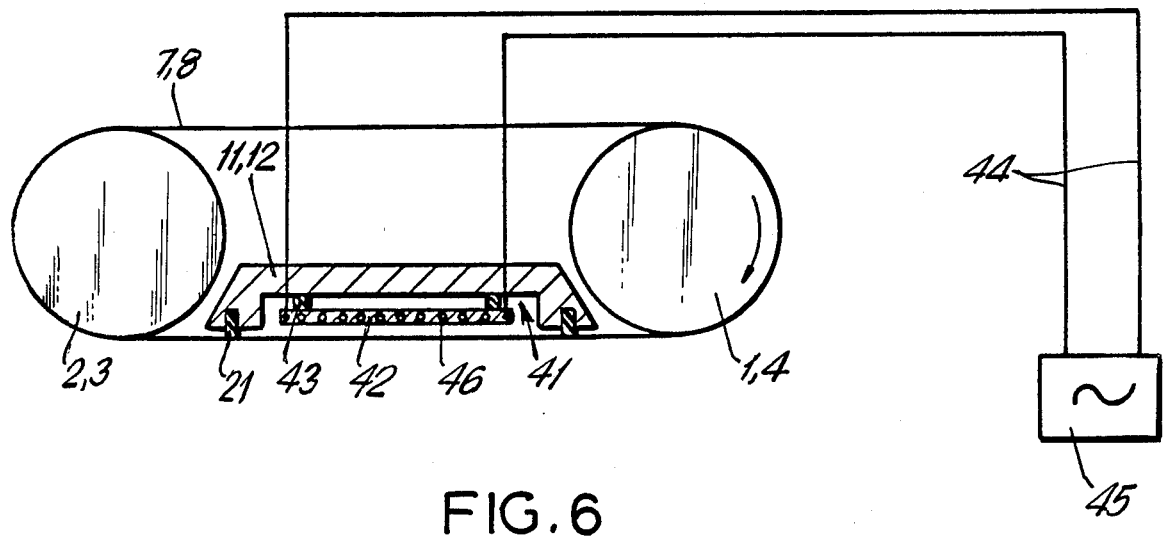
FIG. 6 is a schematic sectional view of a press band unit with a basic electrical circuit for the inductive heating of the press band.

In another embodiment of the invention, inductive heating by means of eddy current losses is shown in FIG. 6 at a press band unit of the double band press 15. The pressure plate 11, 12 has a rectangular recess 41 for locating an inductor 42. The inductor 42 consists of a rectangular copper plate and is attached by means of mountings 43 to the pressure plate 11, 12 so as to be insulated against it. Lines 44 leading to the inductor 42 pass through the pressure plate 11, 12. These lines 44 are connected to the poles of an alternating (AC) voltage source 45. Bores 46 can be provided in the inductor 42 for cooling purposes through which bores cooling water flows.

The voltage source 45 supplies an alternating voltage to the inductor 42 through lines 44. An alternating voltage is also induced by means of electromagnetic induction in the press bands 7, 8 moving past the inductor. Through this, eddy currents are generated in the press bands 7, 8 which, because of the electrical resistance of the press band, heat the press band 7, 8. The frequency of the alternating voltage depends on the shape of the inductor 42, of the press bands 7, 8, of the quantity of heat to be generated etc., and is determined by the skilled artisan in this field, with the help of concrete available data.

If the pressure plate is attached to the press stand so as to be insulated from it, this pressure plate can also be used as an inductor. Then the transverse or longitudinal bores 23 in the pressure plate 11, 12 (see FIG. 2) which are intended for cooling it are used by a cooling fluid which flows through them. If the heating of the press bands 7, 8 is to occur already prior to the reaction zone, then the inductor can also be attached externally of the pressure plate at a suitable point in the press stand. Naturally, the principles of inductive heating as well as resistance heating can be combined in the same double band press 15 with each other or with additional devices for heat transmission to the press band (for instance, according to DE-OS 33 25 578). It is to be emphasized as a special advantage that the heat generation in the press band by means of electromagnetic induction occurs without physical contact, while in the case of resistance heating, only the small brush surface required for transmission of the current contacts the press band. Thus, considerably lower frictional forces compared to the state of the art are achieved which mean lower driving power and a lower wear of the press bands.

While specific embodiments of the invention have been shown and described in detail to illustrate the application of the inventive principles, it will be understood that the invention may be embodied otherwise without departing from such principles.

What is claimed is:

1. A double band press for the continuous production of endless material webs, comprising: a rigid press stand; bearing bracket means connected to said press stand; a plurality of reversing drums each having a radius and rotatably mounted to said bearing bracket means; an upper and a lower heatable endless press band guided over said reversing drums, said press bands having outer surfaces which are movable adjacent each other to define a reaction zone having an inlet and an outlet end for receiving and pressing a material web therebetween; pressure means connected to said press stand and engaging against inner surfaces of said bands for applying pressure to the reaction zone between said bands; said pressure means comprises a pressure plate connected to said press stand for each band, each pressure plate defining a horizontally extending pressure chamber bounded by said pressure plate and an inner surface of one of said bands, an annular sliding surface seal connected to each pressure plate extending around each pressure chamber and fluid means operatively connected to said pressure plates for passing pressurizing fluid to each said pressure chamber to pressurize said pressure chambers to exert forces on said bands to pressurize said reaction zone, and electric current means operatively connected to said bands for inducing a flow of electric current in said bands to produce electrically induced heating of said bands at least in said reaction zone, said electric current means comprises a source of DC voltage having positive and negative poles, two of said reversing drums forming a first pair of reversing drums at the inlet end of said reaction zone for initially receiving the material web and two of said reversing drums forming a second pair of reversing drums at the outlet end of said reaction zone for discharging the material web, a slip ring transmitter operatively connected to each of said reversing drums of said first and second pairs, said negative pole of said source being connected to the slip ring transmittance near one of said first and second pairs of reversing drums and said positive pole of said source being connected to the slip transmitters adjacent the other of said first and second pairs of reversing drums for passing direct current through said bands for heating said press bands at least in the reaction zone due to the electrical resistance of said press bands, each said slip ring transmitter comprises an arc-shaped mounting plate having a radius which is larger than the radius of the adjacent said reversing drum, each said arc-shaped mounting plate being mounted to and insulated from said press stand, each said arc-shaped mounting plate being spaced outwardly from the adjacent said reversing drum, a plurality of brush mountings connected to each of said arc-shaped mounting plates, and a brush connected to each mounting and slidably engaged against one of said bands, each brush being electrically connected to one pole of said source, an insert connected to each brush mounting, a brush holder connected to each brush and a linkage connected between each insert and a respective brush holder for displaceably mounting each brush holder to one of said inserts, and each said brush holder is adjustable so that said brush therein contacts the outer surface of one of said press bands in a sliding manner.

2. A double band press according to claim 1, wherein each band is made of high tensile steel having electrical resistance for heating said bands by electrical resistance heating through the application of current by said electric current means.

3. A double band press according to claim 1, wherein additional heating means operatively connected to said reversing drums at said inlet side for heating said reversing drums to additionally heat said bands.

4. A double band press according to claim 3, wherein said additional heating means comprises a plurality of channels extending through said reversing drums of said inlet side for circulating heated thermal oil therethrough.

5. A double band press according to claim 1, wherein each of said slip ring transmitters is operatively connected to one of said bands for applying current therethrough adjacent a side edge of said band.

6. A double band press according to claim 1, wherein said slip ring transmitters for each band is positioned across a width of said band.

7. A double band press according to claim 1, including a bearing mounting connected to said press stand for mounting each of said reversing drums, a support connected to each bearing mounting, each arc-shaped mounting plate being connected to one of said supports and said supports being insulated from their respective bearing mountings.

8. A double band press according to claim 1, wherein each brush mounting is pivotally connected to a respective arc-shaped mounting plate for swivelling motion thereon.

9. A double band press according to claim 1, including a copper plate attached to each brush mounting on a side thereof opposite from an adjacent band, a copper wire connecting the brush of each brush mounting to its respective copper plate, each copper plate being connected to one pole of said source of DC voltage.

10. A double band press according to claim 1, wherein each of said brushes is made of graphite.

11. A double band press according to claim 1, wherein each of said brushes is made of bronze.

12. A double band press according to claim 1, wherein each of said brushes is made of copper.

13. A double band press according to claim 1, wherein the number of brushes for each arc-shaped mount is selected in a manner which depends on the magnitude of direct current to be applied to each band by said source of DC voltage.

14. A double band press according to claim 1, wherein each of said reversing drums is coated by insulation to be electrically insulated from the band which it carries.

15. A double band press according to claim 1, including transverse and lateral bores extending through each pressure plate for receiving heating oil for heating each pressure plate.

16. A double band press according to claim 15, including elements made of material having good heat conducting properties attached to each pressure plate and in contact with each band for transmitting heat of each pressure plate to a respective band.

* * * * *